United States Patent
Frommann et al.

[11] Patent Number: 5,665,437
[45] Date of Patent: Sep. 9, 1997

[54] PROCESS AND DEVICE FOR COATING THE SURFACE OF STRIP MATERIAL

[75] Inventors: Klaus Frommann, Meerbusch; Walter Ottersbach; Werner Haupt, both of Duisburg, all of Germany; Vladimir A. Paramonov, Moscow, Russian Federation; Anatolij I. Tychinin, Moscow, Russian Federation; Anatolij I. Moroz, Moscow, Russian Federation; Boris L. Birger, Riga, Latvia; Vladimir M. Foliforow, Riga, Latvia

[73] Assignee: Mannesmann Aktiengesellschaft, Düsseldorf, Germany

[21] Appl. No.: 448,485

[22] PCT Filed: Oct. 22, 1993

[86] PCT No.: PCT/DE93/01022

§ 371 Date: Jun. 7, 1995

§ 102(e) Date: Jun. 7, 1995

[87] PCT Pub. No.: WO94/13850

PCT Pub. Date: Jun. 23, 1994

[30] Foreign Application Priority Data

Dec. 8, 1992 [DE] Germany .......... 42 42 380.5

[51] Int. Cl.⁶ .......... H05B 6/02; B05D 1/18; B22D 11/00; B05C 3/00
[52] U.S. Cl. .......... 427/591; 427/431; 427/434.2; 427/434.5; 427/598; 118/623; 118/405; 118/429; 164/493; 164/471
[58] Field of Search .......... 427/457, 458, 427/561, 591, 594, 431, 433, 434.2, 434.5, 598; 118/620, 405, 429, 623, 419, 420, 423, 434.6, 434.7; 164/493, 471

[56] References Cited

U.S. PATENT DOCUMENTS

| 2,824,021 | 2/1958 | Cook et al. | 427/591 |
| 2,834,692 | 5/1958 | Tama | 118/405 |
| 3,483,030 | 12/1969 | Clarke | 427/594 |
| 3,939,799 | 2/1976 | Kanbara et al. | 118/405 |
| 4,904,497 | 2/1990 | Lewis | 427/434.2 |
| 5,512,321 | 4/1996 | Paramonou et al. | 427/434.2 |

FOREIGN PATENT DOCUMENTS

WO9013377 11/1990 WIPO .......... 164/471

OTHER PUBLICATIONS

Patent Abstracts of Japan:JP2,298,247; Pub. Oct. 12, 1990; Kawamura et al. "Plating Method with Molten Metal".

Patent Abstracts of Japan:JP3,079,747; Pub. Apr. 4, 1991; Yasunaga et al. "Molten Metal Plating Apparatus".

*Primary Examiner*—Marianne Padgett
*Attorney, Agent, or Firm*—Cohen, Pontani, Lieberman, Pavane

[57] ABSTRACT

A process and a device for coating the surface of strip material, especially non-ferrous metal and steel strip, with a metal coating, wherein the material is conducted without reversal of direction through a container holding the molten coating material. The container has a passage duct below the level of the melting bath, in which induction currents are induced by an electromagnetic travelling field and produce, in interaction with the electromagnetic travelling field, an electromagnetic force for restraining the coating material. In order to stabilize the melt in the passage duct as well as in the container, and in order to attain, to a large extent, a counterbalance between hydrostatic and electromagnetic forces, a constant direct or alternating current field is directed opposite to the travelling field in the area near the container, damping the movement in the coating material. For this purpose, an additional iron core, which has coils running parallel to the inductor coils and can be subjected to direct or alternating current, is arranged above each inductor on both sides of the passage duct.

5 Claims, 2 Drawing Sheets

PROCESS AND DEVICE FOR COATING THE SURFACE OF STRIP MATERIAL

BACKGROUND OF THE INVENTION

The invention relates to a process and a device for carrying out the process for coating the surface of strip material, especially non-ferrous metal and steel strip, with a metal coating. In the process, the material is conducted without reversal of direction through a container holding the melted coating material that has, below the level of the melting bath, a passage duct, in which induction currents are induced in the coating material by an electromagnetic travelling field and produce, in interaction with the electromagnetic travelling field, an electromagnetic force for restraining the coating material.

DESCRIPTION OF THE PRIOR ART

Such a process and device for coating continuous strips is known from the SU Authorship Certificate 1 157/125. In order to prevent the molten coating material from flowing out through the passage duct located on the underside of the container, the principle of an induction pump is applied. In such pumps for delivering molten metal, the forces generated by induction are used to agitate the metal with the field and to supply the necessary pressure to the pump. By installing an induction pump of this type below the bath container and ensuring that the pressure produced in the duct by the induction pump equals the hydrostatic pressure of the molten coating material, it is possible to prevent the coating material from flowing out. To this end, the inductor is switched in such a way that the travelling field moves toward the container bottom, producing the restraining effect.

The interaction of the magnetic field with the currents induced in the molten coating material produces electromagnetic forces within the area of the inductors along the entire length of the duct. Because the electromagnetic forces produced in each cross-section along the duct add up, the pressure created by these forces increases along the duct in the direction of the container bottom. Theoretically, the outflow through the duct should be stopped at a length where the pressure created by the pumping action of the induction pumps is equal to the hydrostatic pressure in the container.

In practice, however, it has been shown that the electromagnetic effect in the passage duct follows a complicated pattern, because, as must be noted, the coating material is a liquid, the layers of which move relative to one another. Especially in flat, broad ducts, like those needed for the through passage of strip material, the electromagnetic forces in the duct cross-section are unevenly distributed and may drop to zero at the ends if the inductors are not designed so as to achieve the most even possible distribution of the forces.

In any case, this uneven distribution of the magnetic forces in the flow-out area in the passage duct of the container makes itself felt in eddies: in the center of the duct, the coating material moves in the direction of the travelling field, while in the side area, under the influence of the regular hydrostatic pressure from the coating material, it moves in the opposite direction. Because of the high current speed, the duct is subjected to increased wear.

SUMMARY OF THE INVENTION

The object of the present invention is, while eliminating the aforementioned shortcomings, to create a process and device of the generic type with which a quieting of the melt is achieved in the passage duct as well as in the container and with which a counterbalance is attained to a large extent between the hydrostatic and the electromagnetic forces.

To attain this object the inventive process includes superpositioning a constant direct or alternating current field onto the travelling field in the area near the contained. This superposed field damps movement in the coating material. Directing a constant field opposite to the travelling field damps the electromagnetic forces, especially in the area of the container-side entrance to the passage duct, so that the unequal forces at this point are homogenized.

According to the invention, a device for carrying out the process which device has rotary current inductors, which are located on both sides of the passage ducts and produce induction currents in the coating material and consist of iron core packets with colts run in grooves arranged at a right angle to the passage duct, is improved in that an additional iron core having coils which run parallel to the inductor coils and to which direct or alternating current can be applied, is arranged above each inductor on both sides of the passage duct. These additional coils permit the constant field proposed by the invention to be superposed on the travelling field, helping to quiet the coating material in this area.

According to a further feature of the invention, the iron cores of the coils to which direct or alternating currents can be applied are L-shaped. One leg of the L-shape frontally adjoins the iron core of the inductor, while the other leg is directed frontally to the supply duct. Because the iron cores are L-shaped and bent at a right angle, the magnetic field of the additional coil is conducted in the effective direction, in which the counterforces equal to the electromagnetic forces that result from the travelling field become effective.

According to another advantageous feature of the invention, the leg of the L-shaped iron core which faces the passage duct is farther away from the passage duct in the center than on the sides. In this way, the irregular distribution of the electromagnetic forces in the passage duct is taken into account. For example, the distance between the fronts of the legs and the sides of the passage duct may equal only 10% of distance between the fronts of the legs and the duct center. The transition is continuous.

The invention not only permits the working life of the metal duct to be prolonged, but also reduces the danger of oxidation in the coating material and improves coating quality.

DETAILED DESCRIPTION OF THE PREFERRED EMBODIMENTS

Figure 1:
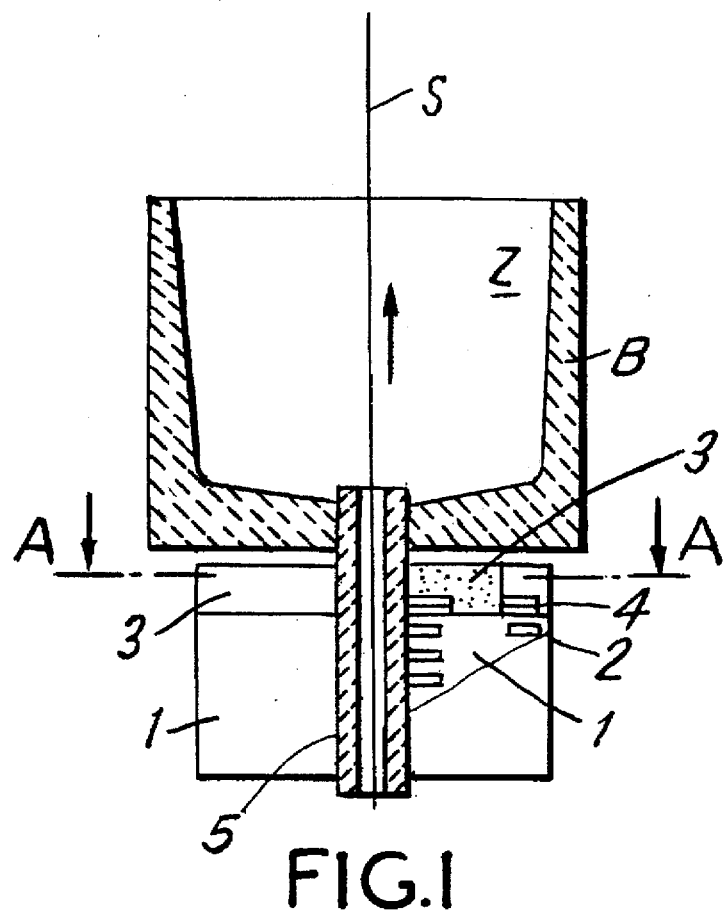
FIG. 1 is a cross-section of the inventive device.

As can be seen in FIG. 1, a refractory container B holds a molten coating material Z, for example, zinc. A passage duct 5 of ceramic material is provided in the bottom of the container B, through which the material to be coated is conducted upwards from below, for example, a steel strip S. Both the container B and the passage duct 5 are provided so that they can be exchanged to facilitate different molten coating materials.

On both sides of the passage duct 5, which extends downward from the bottom of the container B, there are inductors, which consist of iron cores 1 with coils 2 that run in grooves. These coils 2 are subjected to a rotary current, which produces a travelling field in the inductors, the electromagnetic forces of which, produced in interaction with the electromagnetic travelling field, are directed upward. In this way, the coating material Z is prevented from flowing out of the passage duct 5 when the electromagnetic forces are in equilibrium with the hydrostatic forces from the coating material Z.

Because the travelling field produced in the inductors is irregular across the breadth of the duct, it causes eddies in the area near the bottom of the passage duct, which lead to agitation of coating material in this area and in the container B. In order to prevent this, the additional iron cores 3 are provided, along with the iron core I of the inductors, between the container B and the inductors and are also equipped with a coil 4. However, this coil is subjected to direct or alternating current, so that a constant electromagnetic field is created, which produces forces directed opposite to the electromagnetic forces created by the travelling field. As a result, in the upper area of the passage duct 5, the turbulence in the coating material is damped, and the movement of the bath is largely quieted.

It can be seen from FIG. 1 that the iron cores 3 of the additional coils are designed in an L-shape, with the longer leg adjacent to the passage duct 5 and the shorter leg adjacent to the iron core of the inductor.

Figure 2:
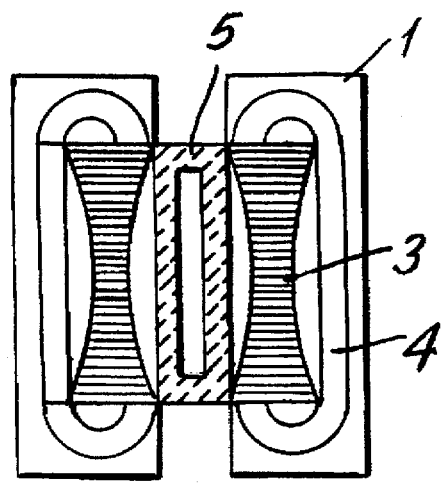
FIG. 2 is a view along line A—A of FIG. 1.
Figure 3:
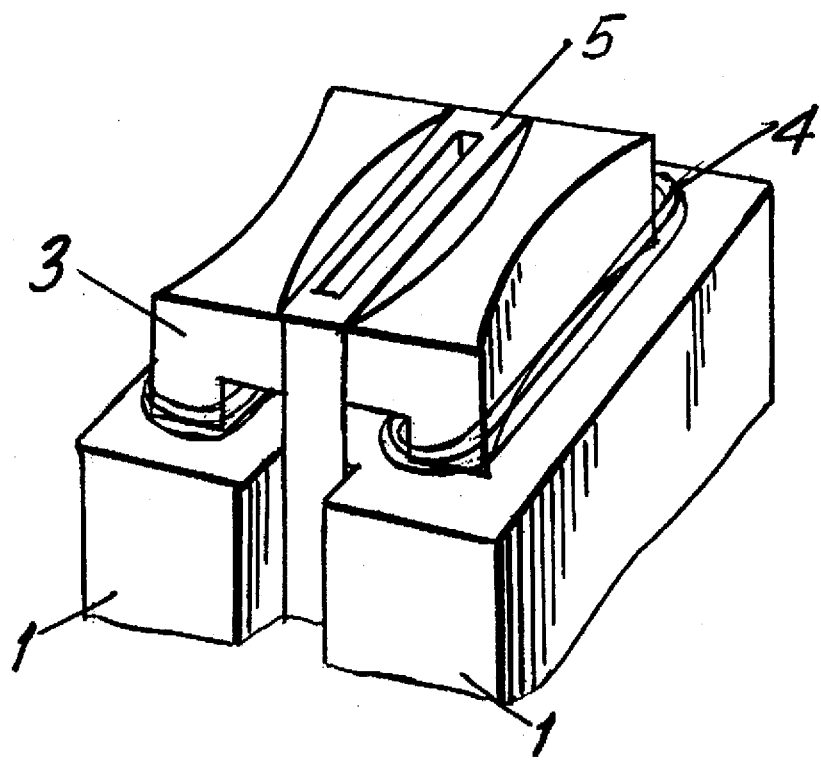
FIG. 3 is a perspective view which illustrates the L-shaped iron core.

As can be seen in FIG. 2, the central area of the front side of the L-shape is farther away from the outer wall of the passage duct than the sides are. In this way, the irregular distribution of the electromagnetic forces from the travelling field is taken into account and the homogenizing effect on the coating material is achieved.

We claim:

1. A process for coating a strip material surface with a metal coating, comprising the steps of: conducting the strip material upwardly in a vertical direction through a bath of molten coating material arranged in a container that has, below a melting bath level, a passage duct, so that the strip material passes through said passage duct, into said bath and is coated with the metal coating; inducing induction currents in the coating material in the passage duct by an electromagnetic travelling field generated by inductor means including iron cores, and producing, by interaction with the electromagnetic travelling field, an electromagnetic force to restrain the coating material from flowing out the passage duct; and directing one of a constant direct current field and an alternating current field opposite to the travelling field with additional iron cores arranged above the iron cores of the inductor means and below the container, in an area sufficiently proximate the container in order to damp movement in the coating material.

2. A device for coating a strip material surface, comprising:

a refractory container for holding a molten coating material;

a passage duct connected to the container so as to define a passage having a longitudinal axis, the passage duct having two oppositely directed outer sides;

rotary current inductor means at the two outer sides of the passage duct for producing induction currents in the coating material, the inductor means including iron cores having grooves arranged at a right angle to the passage duct and coils arranged in the groves; and additional separate iron cores, each of said additional separate iron cores being respectively arranged above one of said iron cores of the inductor means on the two outer sides of the passage duct, each additional iron core having a coil that is subjectable to one of a direct current and an alternating current, and runs parallel to the coils of the inductor means.

3. A device as defined in claim 2, wherein the additional iron cores are L-shaped, each said L-shaped additional iron core having a first leg adjacent to the iron core of the inductor means and a second leg directed toward one of the outer sides of the passage duct.

4. A device as defined in claim 3, wherein the second leg of each of the L-shaped additional iron cores has a front face that faces the passage duct and is shaped so that, in a direction perpendicular to the longitudinal axis, outer side edges of the front face are at a lesser distance from the outer side of the passage duct than a central area of the front face.

5. A device as defined in claim 2, wherein the container and the passage duct are configured so as to be replaceable to accommodate differing molten coating materials.

* * * * *